United States Patent
Pu et al.

(10) Patent No.: US 11,919,058 B2
(45) Date of Patent: Mar. 5, 2024

(54) METHOD FOR REMEDIATING PETROLEUM HYDROCARBON CONTAMINATION IN GROUNDWATER

(71) Applicant: CHENGDU UNIVERSITY OF TECHNOLOGY, Sichuan Province (CN)

(72) Inventors: Shengyan Pu, Sichuan Province (CN); Peng Wang, Sichuan Province (CN); Shibin Liu, Sichuan Province (CN); Xin Wang, Sichuan Province (CN); Hui Ma, Sichuan Province (CN); Pei An, Sichuan Province (CN)

(73) Assignee: CHENGDU UNIVERSITY OF TECHNOLOGY, Sichuan Province (CN)

( * ) Notice: Subject to any disclaimer, the term of this patent is extended or adjusted under 35 U.S.C. 154(b) by 0 days.

(21) Appl. No.: 18/203,767

(22) Filed: May 31, 2023

(65) Prior Publication Data
US 2024/0024936 A1  Jan. 25, 2024

(30) Foreign Application Priority Data
Jul. 19, 2022 (CN) .......................... 202210856445.4

(51) Int. Cl.
| | | |
|---|---|---|
| *B09C 1/08* | (2006.01) | |
| *B09C 1/10* | (2006.01) | |
| *C02F 3/28* | (2023.01) | |
| *C02F 3/34* | (2023.01) | |
| *C02F 101/32* | (2006.01) | |
| *C02F 103/06* | (2006.01) | |

(52) U.S. Cl.
CPC .................. *B09C 1/08* (2013.01); *B09C 1/10* (2013.01); *C02F 3/28* (2013.01); *C02F 3/34* (2013.01); *B09C 2101/00* (2013.01); *C02F 2101/32* (2013.01); *C02F 2103/06* (2013.01); *C02F 2305/04* (2013.01); *C02F 2305/06* (2013.01)

(58) Field of Classification Search
None
See application file for complete search history.

(56) References Cited

U.S. PATENT DOCUMENTS

| | | | | |
|---|---|---|---|---|
| 6,893,862 | B1* | 5/2005 | Horn ......................... | B09C 1/10 435/243 |
| 2008/0273925 | A1 | 11/2008 | Borden et al. | |
| 2012/0045283 | A1* | 2/2012 | Castellano ................ | B09C 1/08 405/128.5 |

FOREIGN PATENT DOCUMENTS

| | | |
|---|---|---|
| CN | 101947539 A | 1/2011 |
| CN | 108687125 A | 10/2018 |
| CN | 109158413 A | 1/2019 |
| CN | 110947746 A | 4/2020 |
| CN | 108672492 B | 9/2020 |
| CN | 109298002 B | 10/2020 |
| CN | 114029327 A | 2/2022 |
| IN | 101730596 A | 6/2010 |
| JP | 2000167533 A | 6/2000 |

OTHER PUBLICATIONS

Shrihari et al. "Bioremediation", in 3366/MUM/2012 A, Published On Jun. 20, 2014, pp. 1-14. (Year: 2014).*
First Office Action of Corresponding Chinese Patent Application No. 202210856445.4 dated Dec. 30, 2022.
Technology of Soil and Water Restoration (English Translation).

* cited by examiner

*Primary Examiner* — William H. Beisner
(74) *Attorney, Agent, or Firm* — Miles & Stockbridge PC; Ajay A. Jagtiani

(57) ABSTRACT

The invention relates to a method for microbial remediation of underground water petroleum hydrocarbon contamination by regulating soil buffer capability, which comprises detecting the soil particle size of contaminated site soil, dividing the contaminated site soil into coarse-grained soil and fine-grained soil; dividing the contaminated site soil into high buffer capacity soil and low buffer capacity soil; and adjusting the composition and ratio of a biostimulant solution added to the contaminated site soil based on the classification of the contaminated site soil. The detecting step includes classifying soil with a particle size between 0.075 mm and 60 mm and a mass greater than or equal to 50% of the total mass as coarse-grained soil; and classifying soil with a particle size not greater than 0.075 mm and a mass greater than or equal to 50% as fine-grained soil.

8 Claims, 1 Drawing Sheet

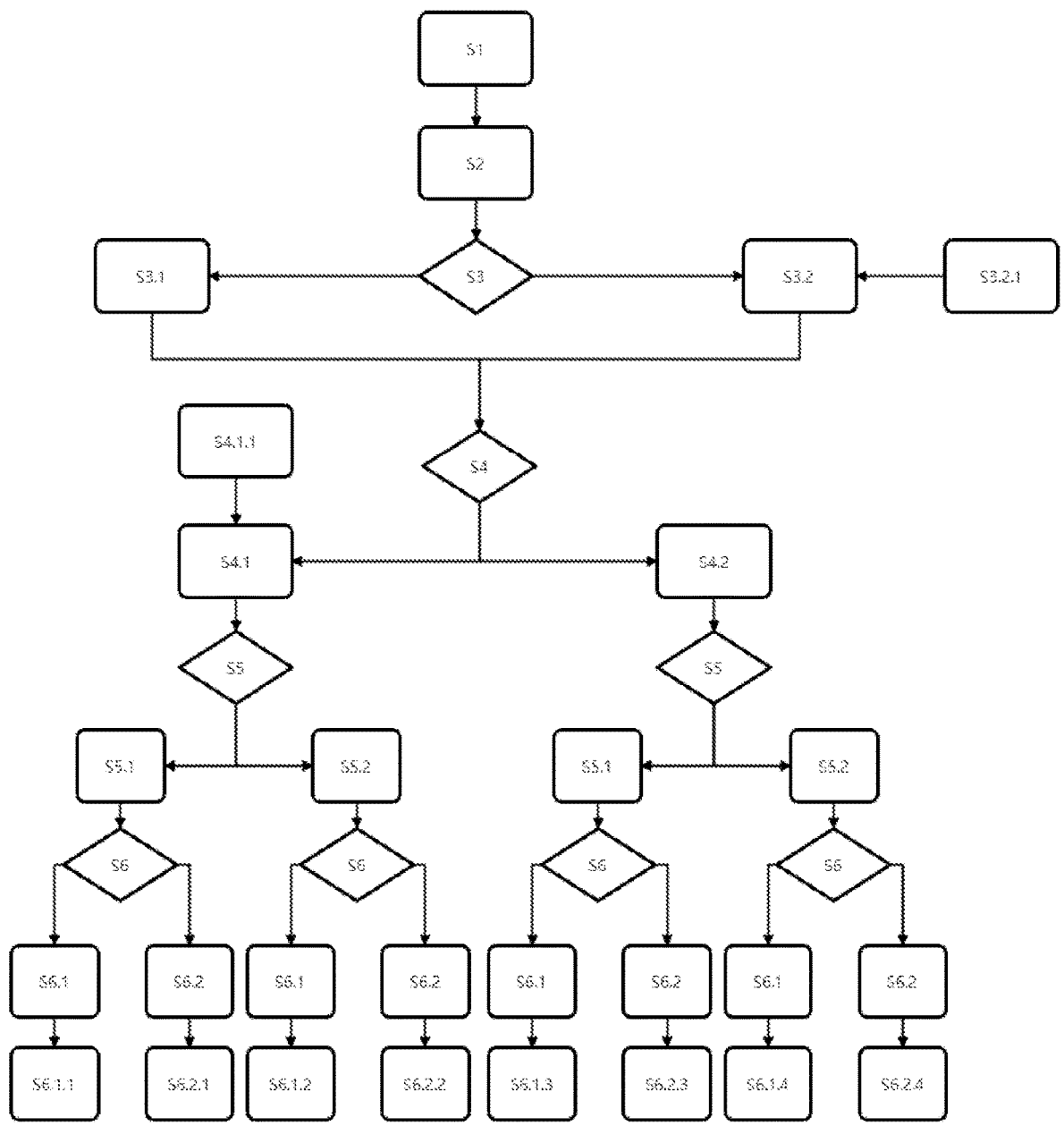

METHOD FOR REMEDIATING PETROLEUM HYDROCARBON CONTAMINATION IN GROUNDWATER

CROSS-REFERENCE TO RELATED APPLICATION

This application claims benefit of priority of Chinese Application No. 202210856445.4 filed on Jul. 19, 2022. The entire contents and disclosure of this patent application is incorporated herein by reference in its entirety.

TECHNICAL FIELD

This invention relates to the technical field of contamination remediation, in particular to a method for remediating petroleum hydrocarbon contamination in groundwater.

BACKGROUND

Due to the process of oil extraction, transportation, storage or accidental leakage, a large amount of petroleum hydrocarbons seep into the ground, causing petroleum hydrocarbon contamination in groundwater and soil. The damage coverage of petroleum contamination is quite wide, which is harmful to birds, seabed organisms and green plants, people and marine resources. In addition, its special physical and chemical properties and environmental restrictions such as burial conditions make it more difficult to control and remediate petroleum hydrocarbon pollutants. Currently, there are many remediation technologies for petroleum-contaminated soil, but each has its own characteristics. Traditional remediation technologies include physical treatment technology, chemical treatment technology and biological treatment technology. Considering the high cost of physical treatment technology, the secondary contamination caused by chemical methods, and the long cycle of biological treatment technology, in actual operation, a combination of multiple methods for the remediation method is often used in order to learn from each other's strengths, improve the remediation effect, and avoid the limitations of a single operation method. In recent years, a variety of enhanced bioremediation technologies aim to improve the sustainability, extensiveness and remediation efficiency of bioremediation. However, due to the limitations of environmental conditions and bioavailability, as well as the problems of insufficient biomass and low activity, natural biological remediation usually cannot achieve the complete degradation of petroleum hydrocarbon contamination or it is difficult to complete the remediation requirements within a certain period of time. The remediation time is long and the effect is not ideal. It is difficult to suppress the migration and diffusion of petroleum hydrocarbon pollutants. Therefore, various methods are often required to strengthen the process of microbial remediation of contamination.

In situ bioremediation technology adopts microorganisms capable of degrading hydrocarbons to degrade petroleum hydrocarbons into non-toxic products through aerobic or anaerobic biodegradation pathways, so as to achieve the effect of environmental remediation. However, due to the limitation of environmental conditions and bioavailability, as well as the problems of insufficient biomass and low activity, natural bioremediation usually cannot achieve the complete degradation of petroleum hydrocarbon contamination or it is difficult to complete the remediation requirements within a certain period of time. The remediation time is long and the effect is not ideal, the migration and diffusion of petroleum hydrocarbon pollutants is difficult to suppress, and various means are often required to strengthen the process of microbial remediation of contamination. In recent years, a variety of enhanced bioremediation technologies have been adopted, with the aim of improving the sustainability, extensiveness and remediation efficiency of bioremediation.

The prior art such as CN109298002B provides a method for predicting the degradation rate of sodium persulfate remediating petroleum hydrocarbon-contaminated soil. It aims at the problem that the remediation effect of sodium persulfate on different soil petroleum hydrocarbon contamination is quite different. Considering that its remediation effect is affected by factors such as soil mineral element content, soil organic matter content, total petroleum hydrocarbon content and effective state, and remediation conditions. A series of soil remediation experiments were carried out, and a multivariate quadratic regression method was used to construct a correlation model between soil petroleum hydrocarbon degradation rate and various factors. Due to the differences in the geographical environment of the soil, the composition of the soil varies greatly, and there are many factors affecting the degradation of petroleum hydrocarbons. The prediction model will have a large error for the soil conditions of the special geographical environment. Secondly, the microorganisms in the soil also play a crucial role on soil remediation, and this approach does not take into account the effects of microbes.

Prior art such as CN108672492B relates to a method for constructing an organic fertilizer nutrient system for biostimulation remediation of oil-contaminated soil. The steps of the method are as follows: through the determination and analysis of the basic physical and chemical properties of 7 kinds of organic fertilizers, the optimal two kinds of organic fertilizers such as chicken manure and cow manure are preliminarily screened out to construct the organic fertilizer nutrient system. Adding the organic fertilizer nutrient system at a mass ratio of 5% to petroleum hydrocarbon-contaminated soil, can improve the soil environment, increase the activity of indigenous microorganisms, and then accelerate the degradation of petroleum hydrocarbon pollutants through organic fertilizer biostimulation. However, this method needs the collection of organic fertilizer to be carried out first and requires high-temperature fermentation, sterilization, deodorization and other measures to process the organic fertilizer after obtaining a sufficient amount of organic fertilizer, and the operation process is relatively complicated.

The prior art such as CN109158413A provides a sustained-release microbial stimulant and preparation method and application thereof. The preparation method is as follows: biomass is pyrolyzed under anaerobic conditions to obtain biomass-based charcoal and crushed; the biomass-based charcoal, stimulant, water, cross-linking agent, alkali and acrylic acid are mixed in a reaction kettle, and inert gas is passed through to remove oxygen in the reaction kettle, stirred and kept warm, and then an initiator is added to react to obtain a gel. The gel is extruded, granulated and dried to obtain a sustained-release microbial stimulant. This method needs to provide anaerobic conditions for preparation, and in addition requires equipment such as a reaction kettle, the cost is high, the conditions are relatively harsh, and it cannot be prepared by conventional means.

Due to the complex soil environment, many factors need to be considered when constructing the model. The solutions used in the prior art cannot effectively address the changing soil environment. The raw materials and processing methods used for soil remediation are complex and the processing environment is harsh. Therefore, it is necessary to propose different remediation solutions for different contaminated sites and for that are conducive to implementation.

In addition, on the one hand, there are differences in the understanding of those skilled in the art. On the other hand, the inventor has studied a large number of documents and patents when making the present invention. However, due to space limitations, all details and contents have not been listed in detail. But, this is by no means that the present invention does not possess the characteristics of these prior art. On the contrary, the present invention already possesses all the characteristics of the prior art, and the applicant reserves the right to add relevant prior art to the background technology.

SUMMARY OF THE INVENTION

In view of the deficiencies in the prior art, the present application proposes a method for remediating petroleum hydrocarbon contamination in groundwater, specifically for the classification of coarse-grained soil and fine-grained soil. The method comprises the following steps: detecting the soil particle size of contaminated site soil, and dividing the contaminated site soil into coarse-grained soil and fine-grained soil according to the soil particle size; dividing the contaminated site soil into high buffer capacity soil and low buffer capacity soil according to the buffer performance of the contaminated site soil; and adjusting the composition and ratio of a biostimulant solution added to the contaminated site soil based on the classification of the contaminated site soil, so as to improve the ability of microorganisms in the contaminated site soil to degrade petroleum hydrocarbons.

According to a preferred embodiment, the step of detecting the soil particle size of contaminated site soil and dividing the contaminated site soil into coarse-grained soil and fine-grained soil according to the soil particle size comprises: classifying soil with a particle size between 0.075 mm and 60 mm and a mass greater than or equal to 50% of the total mass as coarse-grained soil; and classifying soil with a particle size not greater than 0.075 mm and a mass greater than or equal to 50% as fine-grained soil.

According to a preferred embodiment, the step of dividing the contaminated site soil into high buffer capacity soil and low buffer capacity soil according to the buffer performance of the contaminated site soil comprises: adding 10 mM citrate buffer solution to the soil to classify the soil with pH<4.5 as low buffer capacity soil and classify the soil with pH>4.5 as high buffer capacity soil. Soil buffer capacity can affect the adsorption of elements in stimulating solution and how pass through the soil matrix. The difference in buffer capacity will change the bioavailability of phosphorus in the soil. Classifying the soil according to the buffer capacity can prevent the precipitation of calcium/magnesium phosphate minerals in the soil that are not bioavailable to the microorganisms when the biostimulant solution flows through the soil with high buffer capacity.

According to a preferred embodiment, the method further comprises: adding a biosurfactant to the fine-grained soil to desorb the petroleum hydrocarbons adsorbed on the clay when the soil particle size of the contaminated site soil is fine-grained soil; adding no biosurfactant when the soil particle size of the contaminated site soil is coarse-grained soil. Because the content of physical clay in the soil determines the difference in buffer capacity due to the difference in soil texture, generally, the higher the content of physical clay, the stronger the buffer capacity. Therefore, the addition of buffer needs to be determined according to the viscosity of the soil for more accurate delivery.

According to a preferred embodiment, the method further comprises: dividing the contaminated site soil into calcareous soil and calcium-depleted soil according to the calcium content of the contaminated site soil, wherein the soil with the magnesium-calcium ratio Mg:Ca<0.12 in the soil is classified as calcareous soil, and the soil with the magnesium-calcium ratio Mg:Ca>0.12 in the soil is classified as calcium-depleted soil. The addition of the biostimulant solution and its reaction with the soil matrix, as a nutrient source of phosphorus, such as the formation of secondary phosphorus minerals, will affect the microbial degradation in the soil. For example, the generation of brushite ($CaHPO4 \cdot 2H_2O$) will enhance the degradation ability of biostimulants to strengthen hydrocarbons, while new brushite ($MgHPO_4 \cdot 3H_2O$) is easily formed in calcium-deficient soils to weaken the degradation of hydrocarbons.

According to a preferred embodiment, the method further comprises: dividing the contaminated site soil into high-iron soil and low-iron soil according to the iron content of the contaminated site soil, wherein the soil with iron content >30 mg/L is classified as high-iron soil, and the soil with iron content <30 mg/L is classified as low-iron soil.

According to a preferred embodiment, when the buffer performance of the contaminated site soil is high buffer capacity, calcareous and high-iron soil, $MgSO_4$ is added into the soil as a chelating agent and electron acceptor $SO_4^{2-}$ is provided; when the buffer performance of the contaminated site soil is high buffer capacity, calcareous and low-iron soil, low-molecular organic acid as chelating agent is added into the soil and sulfate is added to provide electron acceptor $SO_4^{2-}$.

According to a preferred embodiment, when the buffer performance of the contaminated site soil is high buffer capacity, calcium-depleted and high-iron soil, sulfate is added into the soil as a chelating agent and electron acceptor $SO_4^{2-}$ is provided; when the buffer performance of the contaminated site soil is high buffer capacity, calcium-depleted and low-iron soil, low-molecular organic acid or sulfate is added into the soil as a chelating agent, wherein sulfate can provide electron acceptor $SO_4^{2-}$.

According to a preferred embodiment, when the buffer performance of the contaminated site soil is low buffer capacity, calcareous and high-iron soil, sulfate is added into the soil as a chelating agent to provide electron acceptor $SO_4^{2-}$; when the buffer performance of the contaminated site soil is low buffer capacity, calcareous and low-iron soil, less low-molecular organic acid is added into the soil than when it is used as a chelating agent, and sulfate is added to provide electron acceptor $SO_4^{2-}$.

According to a preferred embodiment, when the buffer performance of the contaminated site soil is low buffer capacity, calcium-depleted and high-iron soil, sulfate is added into the soil to provide electron acceptor $SO_4^{2-}$; when the buffer performance of the contaminated site soil is low buffer capacity, calcium-depleted and low-iron soil, low-molecular organic acid is added into the soil as a chelating agent and sulfate is added to provide electron acceptor $SO_4^{2-}$.

The main mechanisms of microbial degradation of petroleum hydrocarbons in the groundwater of contaminated sites are sulfate reduction and methanogenesis. However, with the degradation of petroleum hydrocarbon, the available electron acceptor $SO_4^{2-}$ gradually decrease, and the degradation of petroleum hydrocarbon gradually evolves into the process of methanogenesis, with low efficiency, which will inhibit the degradation ability. Therefore, adding sulfate into the soil to provide the electron acceptor $SO_4^{2-}$ can replenish the electron acceptor in time, thereby increasing the degradation rate and stimulating the microbial degradation of petroleum hydrocarbons in groundwater.

When the buffer performance of the contaminated site soil is high buffer capacity, calcareous and high-iron soil, a first salt chelating agent is added into the soil to provide electron acceptor $SO_4^{2-}$, so that the $SO_4^{2-}$ provided by a single donor in the contaminated site soil is in the range of the first acceptor.

When the buffer performance of the contaminated site soil is high buffer capacity, calcareous and low-iron soil, a first concentration of low-molecular organic acid chelating agent is added into the soil, and a second concentration of first salt chelating agent is simultaneously added to provide electron acceptor $SO_4^{2-}$, wherein the first concentration is configured in such a way to be equal to the $Ca^{2+}$ content in the contaminated site under the current situation, and the overall content of $SO_4^{2-}$ provided by multiple sources of the first salt chelating agent and/or low-molecular organic acid chelating agent acid is in the range of the first acceptor.

The first salt chelating agent is preferably magnesium sulfate. The first concentration is configured along with the calcium ion content in the polluted soil. When the calcium ion content is "a", the first concentration is also configured as "a" accordingly, so that the organic acid chelating agent can form an equivalent chelation with the calcium ion in the soil, so that the calcium ions are combined with the chelating agent in advance to prevent the calcium ions from accepting the sulfate radical receptors provided subsequently to form a precipitate. At the same time, the second concentration is configured to be greater than the first concentration, especially, the second concentration is preferably configured to be 5-15 times of the first concentration, preferably 8-10 times, so that the soil can be replenished with a sufficient amount of magnesium ions to make up for the deficiency of magnesium ions. Usually, the content of calcium in calcareous soil is relatively high, and magnesium usually exists as a mineral, which is difficult to naturally transform into a form that can be absorbed by plants. As a result, the content of calcium in the soil is significantly higher than that of magnesium, so this solution chooses to focus on high buffer, calcareous, and low-iron soil to be supplemented with sufficient magnesium, so that high buffer soil can accept a relatively large amount of magnesium penetration and avoid the production of magnesium phosphate that cannot be used by microorganisms.

A second salt chelating agent is added into the soil to provide electron acceptor $SO_4^{2-}$, wherein the second salt chelating agent differs from the first salt chelating agent at least in terms of cation, so that the $SO_4^{2-}$ provided by another single donor different from the first salt chelating agent in the contaminated site soil is in the range of the first acceptor.

The second salt chelating agent is preferably potassium sulfate. This solution chooses to add a non-magnesium chelating agent to low-buffer soil, especially the setting method of potassium-containing chelating agent, so as to avoid the formation of magnesium phosphate that is not easily absorbed due to magnesium elements in an environment with low buffer capacity.

When the buffer performance of the contaminated site soil is high buffer capacity, calcium-depleted and low-iron soil, a first concentration of low-molecular organic acid chelating agent is added into the soil, and a fourth concentration of the second salt chelating agent is simultaneously added to provide electron acceptor $SO_4^{2-}$, wherein the first concentration is configured in such a way to be equal to the $Ca^{2+}$ content in the contaminated site under the current situation, and the overall content of $SO_4^{2-}$ provided by multiple sources of the second salt chelating agent and/or low-molecular organic acid chelating agent acid is in the range of the first acceptor.

For the calcium-depleted soil, this embodiment chooses to add the second salt chelating agent into the soil, because in this case, the content of magnesium is relatively sufficient without additional supplementation, and the second salt chelating agent is configured according to the fourth concentration, wherein the fourth concentration is 3-10 times of the first concentration, preferably 3-7 times.

When the buffer performance of the contaminated site soil is low buffer capacity, calcareous and low-iron soil, a third concentration of low-molecular organic acid chelating agent is added into the soil, wherein the third concentration is configured in such a way to be less than the $Ca^{2+}$ content in the contaminated site under the current situation, the ratio of the low-molecular organic acid to the $Ca^{2+}$ in the contaminated site soil is 0.1-0.9:1. Simultaneously the first salt chelating agent is added into the soil so that the overall content of $SO_4^{2-}$ provided by multiple sources of the first salt chelating agent and/or low-molecular organic acid chelating agent acid is in the range of the first acceptor.

According to a preferred embodiment, the first receptor is in a range from 50 to 70 mg/L.

BRIEF DESCRIPTION OF THE DRAWINGS

FIG. 1 is a flow chart of a method for remediating petroleum hydrocarbon contamination in groundwater according to the present invention.

DETAILED DESCRIPTION

The present invention will be described in detail below in conjunction with the accompanying drawings.

For different types of oil-contaminated sites, when using stimulating solutions to enhance bioremediation, many factors should be considered to select the most suitable solution composition ratio. The present invention specifically solves and strengthens the problem of low in-situ bioremediation efficiency, and proposes different enhanced bioremediation solutions for contaminated sites with buffer capacities of different soil. Specifically, the composition of the biostimulant solution is optimized according to the buffer capacity of the soil to increase microbial activity, thereby enhancing its degradation of petroleum hydrocarbons in soil and groundwater. For different contaminated sites, the biostimulant solution should be properly optimized. Firstly, the hydrogeological conditions of the contaminated site, the characteristics of groundwater and soil contamination, the evolution and distribution of pollutants in time and space, and the attenuation capacity of natural source areas should be analyzed. Characteristic indicators such as groundwater, soil buffer capacity and biological communities in contaminated areas are analyzed comprehensively. Therefore, it is necessary to monitor the oil contamination and the basic background value of the contaminated site first. Therefore, the present invention firstly arranges the groundwater environment monitoring points of the site according to the "Technical Specifications for Groundwater Environment Monitoring HJ 164-2020". For the monitoring area with a large area, the monitoring points are arranged mainly along the groundwater flow direction and supplemented by the vertical groundwater flow direction; for the same hydrogeological unit, control monitoring points can be arranged according to the conditions of groundwater recharge, runoff and discharge. When there are multiple aquifers in the groundwater, the monitoring wells should be stratified monitoring wells with clear horizons. The distribution of monitoring points for groundwater drinking water sources should focus on the mining layer; when there are multiple aquifers, monitoring points should be arranged in the aquifer that is hydraulically connected to the target aquifer, and the surface water that is hydraulically connected to the groundwater is included in monitoring. Areas that have a greater impact on groundwater, such as chemical production enterprises and industrial agglomeration areas, respectively arrange monitoring points in the upstream, center, both sides and downstream areas of groundwater contamination sources; monitoring points for the region such as tailings ponds, hazardous waste disposal sites and landfills, etc., are arranged on the upstream, both sides and downstream of the groundwater contamination source to assess the contamination status of the groundwater. When the contamination source is located in the groundwater supply area, the groundwater monitoring points can be increased according to the actual situation. The monitoring of groundwater around contamination sources is mainly based on shallow groundwater. If the shallow groundwater has been polluted and there are groundwater drinking water sources downstream, it is necessary to increase the monitoring points of groundwater in the main mining layer. The layout of monitoring points in karst areas focuses on tracking the entrances and exits of underground rivers and main aquifers. Monitoring points are arranged according to the shape and scale of the runoff network of the underground river system. Monitoring points are appropriately arranged in the supply and runoff areas between the main pipeline and branch pipelines. The groundwater monitoring points is appropriately increased in the distribution area of heavily or potential contamination sources. The monitoring points in the fissure development area should be arranged on the interconnected fissure network as far as possible. Existing civilian wells, production wells or springs can be selected as groundwater monitoring points. Secondly, the concentration of petroleum hydrocarbons in the groundwater and the natural attenuation process of site pollutants can be obtained by monitoring each monitoring hole. The concentration of petroleum hydrocarbons is detected by gas chromatography. Normal alkanes are used as standard samples, and the chromatographic peaks of the samples under the same chromatographic conditions are integrated to obtain quantitative results. Finally, the reaction wells are effectively arranged to provide basic data, and the decay rate constant is obtained by fitting the decay kinetic equation according to dynamic change characteristics and the obtained data.

The present invention is based on the oligotrophic biostimulation scheme, and prepares the biostimulant solution according to the classification result of the contaminated site type. Based on this, the present invention comprises the following steps: detecting the soil particle size of contaminated site soil, and dividing the contaminated site soil into coarse-grained soil and fine-grained soil according to the soil particle size; dividing the contaminated site soil into high buffer capacity soil and low buffer capacity soil according to the buffer performance of the contaminated site soil; and adjusting the composition and ratio of a biostimulant solution added to the contaminated site soil based on the classification of the contaminated site soil, so as to improve the ability of microorganisms in the contaminated site soil to degrade petroleum hydrocarbons.

According to a preferred embodiment, the step of detecting the soil particle size of contaminated site soil and dividing the contaminated site soil into coarse-grained soil and fine-grained soil according to the soil particle size comprises: classifying soil with a particle size between 0.075 mm and 60 mm and a mass greater than or equal to 50% of the total mass as coarse-grained soil; and classifying soil with a particle size not greater than 0.075 mm and a mass greater than or equal to 50% as fine-grained soil.

According to a preferred embodiment, the step of dividing the contaminated site soil into high buffer capacity soil and low buffer capacity soil according to the buffer performance of the contaminated site soil comprises: adding 10 mM citrate buffer solution to the soil to classify the soil with pH<4.5 as low buffer capacity soil and classify the soil with pH>4.5 as high buffer capacity soil. Soil buffer capacity can affect the adsorption of elements in stimulating solution and how pass through the soil matrix. The difference in buffer capacity will change the bioavailability of phosphorus in the soil. Classifying the soil according to the buffer capacity can prevent the precipitation of calcium/magnesium phosphate minerals in the soil that are not bioavailable to the microorganisms when the biostimulant solution flows through the soil with high buffer capacity.

According to a preferred embodiment, the method further comprises: adding a biosurfactant to the fine-grained soil to desorb the petroleum hydrocarbons adsorbed on the clay when the soil particle size of the contaminated site soil is fine-grained soil; adding no biosurfactant when the soil particle size of the contaminated site soil is coarse-grained soil. The acid buffer capacity of different texture types of soil is clay>medium loam>light loam>sandy loam>sandy soil. Among them, coarse-grained soil contains sand and gravel, and fine-grained soil has a high content of clay. In sites with high clay content, surfactants can be added appropriately to desorb hydrocarbons from clay minerals to improve their bioavailability. Preferably, it is very important to select an environmentally friendly biosurfactant, such as biosurfactant rhamnolipid, etc., which can avoid secondary contamination to the environment. It can also be selected according to the dominant bacteria at the site. For example, the bacteria that can use crude oil as a carbon source and produce bioemulsifiers to emulsify petroleum hydrocarbons have been isolated from beach mud samples polluted by crude oil.

According to a preferred embodiment, the method further comprises: dividing the contaminated site soil into calcareous soil and calcium-depleted soil according to the calcium content of the contaminated site soil, wherein the soil with the magnesium-calcium ratio Mg:Ca<0.12 in the soil is classified as calcareous soil, and the soil with the magnesium-calcium ratio Mg:Ca>0.12 in the soil is classified as calcium-depleted soil. Preferably, sulfates (magnesium sulfate, potassium sulfate), phosphates, and low-molecular organic acids can be used to chelate released calcium, catalyze the dissolution of phosphate and carbonate minerals, directly compete with phosphate for adsorption sites, and prevent them from causing phosphate precipitation. Preferably, a common low-molecular organic acid, such as citrate, can also be used to effectively increase the available phosphorus in the soil. Preferably, the phosphorus source can be potassium dihydrogen phosphate $KH_2PO_4$, which is often used as a high-efficiency phosphorus-potassium compound fertilizer in agriculture, and has the advantages of being cheap, easy to obtain, and environmentally friendly. Preferably, in the calcium-depleted soil, adding potassium sulfate can avoid adding magnesium sulfate to cause insoluble new boronite (magnesium hydrogen phosphate trihydrate mineral) to be generated. In the meantime, after adding sulfate, it is necessary to ensure that the dosage can promote the degradation of petroleum hydrocarbons, and to avoid excessive $SO_4^{2-}$ content in groundwater, which will affect groundwater quality. Therefore, it is necessary to adjust the $SO_4^{2-}$ concentration in real time through monitoring wells. Preferably, the concentration can be controlled at 50-70 mg/L. Preferably, to improve the solubility of $PO_4^{3-}$, low-molecular organic acids can be added, which can catalyze the dissolution of phosphate and carbonate minerals through chelation, and compete with phosphate for adsorption sites.

According to a preferred embodiment, the method further comprises: dividing the contaminated site soil into high-iron soil and low-iron soil according to the iron content of the contaminated site soil, wherein the soil with iron content >30 mg/L is classified as high-iron soil, and the soil with iron content <30 mg/L is classified as low-iron soil.

According to a preferred embodiment, the method further comprises: by increasing the ratio of citric acid to phosphorus to between 10:1 and 50:1, the buffer capacity of the soil is overcome, the pH is reduced, and the phosphorus desorption is enhanced by the competition with citric acid. Because soil clay, soil carbonate, exchangeable calcium and other factors will cause different soil buffer capacity, it will affect the effectiveness of adding nutrients. Preferably, the citrate can be ferric ammonium citrate ($Fe(III)NH_{4\text{-}critrate}$), using $Fe^{3+}$ to enhance biodegradation, can further enhance the remediation performance, which can be selected according to the actual site. In calcareous soils, there is considerable overlap between buffer capacity and phosphate-citrate interactions. When citrate levels are increased between 10 and 50 mM, the amount of phosphate adsorbed is significantly reduced and phosphorus bioavailability is also increased. By increasing the ratio of citric acid to phosphorus to between 10:1 and 50:1, the buffer capacity of the soil can be overcome, pH can be reduced, and phosphorus desorption can be enhanced by competition with citric acid.

Preferably, the ratio of citric acid to phosphorus can be set between 10:1 and 50:1, the optimum level of citrate is 10 to 50 mM, and the actual dosage of citrate can be determined according to the actual site conditions. In the same low-iron soil, more citrate can be added to the calcareous soil than the calcium-depleted soil to chelate excess $Ca^{2+}$. The specific dosage can be determined according to the calcium content of the actual site. The difference in buffer capacity will change the bioavailability of phosphorus in the soil. When the soil has a high buffer capacity, the biostimulant solution will dissolve the carbonate in the soil to buffer the pH of the soil, resulting in calcium/magnesium phosphate mineral precipitation, resulting in reduced phosphorus bioavailability. Preferably, when the contaminated site is a soil with high buffer capacity, the concentration of phosphate is reduced, or another ligand that can chelate calcium/magnesium, such as $MgSO_4$, phosphate and low-molecular organic acids is added to chelate the released $Ca^{2+}$. Preferably, in iron-rich soils, low-molecular organic acids are not added, thereby avoiding that they do not buffer or chelate calcium and compete for adsorption sites, or even chelate and/or dissolve iron oxide surfaces.

According to a preferred embodiment, when the buffer performance of the contaminated site soil is high buffer performance, calcareous and high-iron soil, $MgSO_4$ is added into the soil as a chelating agent and electron acceptor $SO_4^{2-}$ is provided. When the buffer performance of the contaminated site soil is high buffer capacity, calcareous and low-iron soil, low-molecular organic acid as chelating agent is added into the soil and sulfate is added to provide electron acceptor $SO_4^{2-}$.

According to a preferred embodiment, when the buffer performance of the contaminated site soil is high buffer capacity, calcium-depleted and high-iron soil, sulfate is added into the soil as a chelating agent and electron acceptor $SO_4^{2-}$ is provided; when the buffer performance of the contaminated site soil is high buffer capacity, calcium-depleted and low-iron soil, low-molecular organic acid or sulfate is added into the soil as a chelating agent, wherein sulfate can provide electron acceptor $SO_4^{2-}$.

According to a preferred embodiment, when the buffer performance of the contaminated site soil is low buffer capacity, calcareous and high-iron soil; sulfate is added into the soil as a chelating agent to provide electron acceptor $SO_4^{2-}$; when the buffer performance of the contaminated site soil is low buffer capacity, calcareous and low-iron soil, less low-molecular organic acid is added into the soil than when it is used as a chelating agent, and sulfate is added to provide electron acceptor $SO_4^{2-}$.

According to a preferred embodiment, when the buffer performance of the contaminated site soil is low buffer capacity, calcium-depleted and high-iron soil, sulfate is added into the soil to provide electron acceptor $SO_4^{2-}$; when the buffer performance of the contaminated site soil is low buffer capacity, calcium-depleted and low-iron soil, low-molecular organic acid is added into the soil as a chelating agent and sulfate is added to provide electron acceptor $SO_4^{2-}$. According to a preferred embodiment, the contaminated site soil is classified according to the steps shown in FIG. 1, and different biostimulant solutions are added to the contaminated site with different properties. S1: The petroleum hydrocarbon contamination of the contaminated site is determined. Petroleum hydrocarbon is used as the carbon source of microorganisms, and the ratio of nitrogen source and phosphorus source is subsequently controlled according to the contamination situation, so that the nutrients are controlled under oligotrophic conditions. S2: Microbial properties of soil at different points and depths within the site are investigated in groundwater, according to the investigation results, the distribution characteristics of microbial populations in the contaminated site is analyzed, so as to prevent the construction of wells from causing great disturbance to the microbial community of the site. S3: The particle size of the contaminated site soil is detected, and the soil of the contaminated site is divided into coarse-grained soil and fine-grained soil according to the particle size of the soil. S3.1: The soil with a particle size between 0.075 mm and 60 mm and a mass greater than or equal to 50% of the total mass is classified as coarse-grained soil; and the soil with a particle size not greater than 0.075 mm and a mass greater than or equal to 50% is classified as fine-grained soil. S3.2.1: biosurfactant is added to the fine-grained soil to desorb petroleum hydrocarbons on the clay, thereby improving the bioavailability of hydrocarbons. S4: According to the buffering performance of contaminated site soil, the contaminated site soil is divided into high buffer capacity soil and low buffer capacity soil. S4.1: The soil with pH>4.5 after adding 10 mM citric acid is classified as high buffer capacity soil. S4.2: The soil with pH<4.5 after adding citric acid is classified as low buffer capacity soil. S4.1.1: A chelating agent is added to high buffer solution. S5: The contaminated site soil is divided into calcareous soil and calcium-depleted soil according to the calcium content of the contaminated site soil. S5.1: When Mg:Ca<0.12, the soil can be considered as rich in calcium, and it is calcareous soil. S5.2: When Mg:Ca>0.12, it is calcium-depleted soil. S6: According to the iron content of the contaminated site soil, the contaminated site soil is divided into high-iron soil and low-iron soil. S6.1: When the iron content is >30 mg/L, it is classified as high-iron soil. S6.2: When the iron content is <30 mg/L, it is classified as low-iron soil. S6.1.1: When the soil has high buffer capacity and is calcareous high-iron soil, the $MgSO_4$ added in the soil acts as a chelating agent and provides electron acceptor $SO_4^{2-}$, wherein, adding the $MgSO_4$ keeps the concentration of $SO_4^{2-}$ in the soil of the contaminated site between 50 and 70 mg/L. S6.2.1: The soil has a high buffer capacity and is calcareous and low-iron soil, a first concentration of low-molecular organic acid is added as a chelating agent into the soil and a second concentration of $MgSO_4$ is added to provide electron acceptor $SO_4^{2-}$, wherein, after adding the first concentration of the low-molecular organic acid, the ratio of the low-molecular organic acid to the $Ca^{2+}$ in the soil of the contaminated site is 1:1, the second concentration of $MgSO_4$ is added to make the concentration of the contaminated site $SO_4^{2-}$ in the soil is between 50 and 70 mg/L. 56.1.2: The soil has high buffer capacity, and it is a non-calcium high-iron soil, sulfate is added as a chelating agent and provides electron acceptor $SO_4^{2-}$. S6.2.2: The soil has a high buffer capacity and is a non-calcareous low-iron soil, a first concentration of low-molecular organic acid is added as a chelating agent into the soil and a second concentration of $K_2SO_4$ is added to provide electron acceptor $SO_4^{2-}$, after adding the first concentration of the low-molecular organic acid, the ratio of the low-molecular organic acid to the $Ca^{2+}$ in the soil of the contaminated site is 1:1, and the second concentration of $K_2SO_4$ is added to make the concentration of $SO_4^{2-}$ in the contaminated site soil is between and 70 mg/L. S6.1.3: The contaminated site is calcareous high-iron soil with low buffer, and $K_2SO_4$ is added to the soil as a chelating agent and provides electron acceptor $SO_4^{2-}$, wherein, the $K_2SO_4$ makes the $SO_4^{2-}$ in the soil of the contaminated site at a concentration between 50 and 70 mg/L. S6.2.3: The contaminated site is a low-buffering calcium-low-iron soil, a third concentration of low-molecular organic acid is added as a chelating agent into the soil and a second concentration of $MgSO_4$ is added to provide electron acceptor $SO_4^{2-}$, wherein, after the third concentration of the low-molecular organic acid is added, the ratio of the low-molecular organic acid to the $Ca^{2+}$ in the soil of the contaminated site is 0.1 to and the second concentration of $MgSO_4$ is added to make the contaminated site $SO_4^{2-}$ in the soil is at a concentration of 50-70 mg/L, wherein the third concentration is less than the first concentration. S6.1.4: The contaminated site is non-calcium high-iron soil with low buffer, and the $MgSO_4$ added into the soil acts as a chelating agent and provides electron acceptor $SO_4^{2-}$, the concentration of $SO_4^{2-}$ is between 50 and 70 mg/L. S6.2.4: The contaminated site is low-buffered non-calcium and low-iron soil, a first concentration of low-molecular organic acid is added as a chelating agent into the soil and a second concentration of $MgSO_4$ is added to provide electron acceptor $SO_4^{2-}$, wherein, after adding the first concentration of the low-molecular organic acid, the ratio of the low-molecular organic acid to the $Ca^{2+}$ in the soil of the contaminated site is 1:1, and the second concentration of the $MgSO_4$ is added to make the concentration of $SO_4^{2-}$ in the contaminated site soil is between 50 and 70 mg/L. Among them, it should be noted that $MgSO_4$ should be avoided in the sulfate added to the calcium-depleted soil, so as to avoid the formation of insoluble new boronite. According to the monitoring, the continuous addition of sulfate should make the concentration of $SO_4^{2-}$ in the underground environment controlled at 50-70 mg/L, which can not only enhance the degradation of petroleum hydrocarbons, but also prevent groundwater contamination due to excessive concentration. After dosing, it is necessary to continuously monitor the petroleum hydrocarbon content of the soil groundwater, as well as the content of the contained electron acceptors, chelates, etc., according to the monitoring well, to ensure that the groundwater quality is below the standard, and to maintain the ability to continuously and effectively degrade petroleum hydrocarbons, and adjust the biostimulation solution in time according to the obtained data.

Example: The soil is mainly moist, medium-plastic olive-gray silt with trace amounts of organic matter. The experiment takes high-iron calcium soil with high buffer capacity as an example. Field soil core and biostimulation experiments are conducted. Intact soil cores are placed in amber tanks containing treatment solutions to simulate in situ temperature and anaerobic conditions, and then placed on a rotary shaker to replicate groundwater flow conditions as closely as possible. There are 4 groups in the experiment. Group 1 is a blank group with only deionized water added. Group 2 is a control group. Groups 3 and 4 are experimental groups. Group 3 is added with optimized biostimulant solution, and Group 4 is added with optimized oligotrophic biostimulation solution. Since the contaminated site soil is mainly silt, there is no need to add surfactants. The ratio of C:N:P in non-oligotrophic conditions is 100:11:1, and the contents of N and P are lower in oligotrophic conditions. The specific composition ratio of the biostimulant solution and the first-order kinetic degradation rate of different groups of petroleum hydrocarbons are shown in the following table:

Actual case regulation of soil buffer optimization biostimulation solution composition and petroleum hydrocarbon degradation rate constant (unit: mg/L)

| Experiment Group | Nitrogen Source ($HNO_3$) | Phosphorus Source (tripolyphosphate) | Citrate (ammonium ferric citrate) | $MgSO_4$ | $K_2SO_4$ | Disappearance Rate Constant $d^{-1}$ |
|---|---|---|---|---|---|---|
| Group 1 | | | | | | 0.003 ± 0.004 |
| Group 2 | 800 | 180 | $6.3 \times 10^4$ | 100 | | 0.006 ± 0.004 |
| Group 3 | 800 | 180 | | 100 | | 0.016 ± 0.006 |
| Group 4 | 3.4 | 3.1 | | 100 | | 0.021 ± 0.009 |

The experimental results showed that the optimized biostimulant solution increased the rate constant of petroleum hydrocarbon degradation of the high-iron calcareous group by two times compared with the general group, and increased by nearly 7 times compared with the control group. Wherein the half-life period of the control group is 231 days, that of the general group is 115 days, and that of the experimental group solution is 33 days. It can be concluded that the optimized biostimulation solution can effectively promote the degradation of hydrocarbons. Analyzing the void space of the soil core, there are mainly three types of soil: pores with active bacteria and water flow; biofilm pores with active bacteria and no water flow; and pores without bacteria and water flow. Oligotrophic conditions were confirmed to be more effective than eutrophic conditions, based on analyzes of before and after responses of microbial populations, since eutrophic conditions stimulate mineral precipitation and bacterial overgrowth in solution, which can block preferential flow pathways and increase the difficulty of petroleum hydrocarbon degradation.

It should be noted that the above specific embodiments are exemplary, and those skilled in the art can come up with various solutions inspired by the disclosure of the present invention, and these solutions also belong to the scope of the disclosure of the present invention and fall within the scope of protection of the invention. Those skilled in the art should understand that the description and drawings of the present invention are illustrative rather than limiting to the claims. The protection scope of the present invention is defined by the claims and their equivalents.

The invention claimed is:

1. A method for remediating petroleum hydrocarbon contamination in groundwater, comprising the following steps:
   detecting a soil particle size of contaminated site soil, and dividing the contaminated site soil into coarse-grained soil and fine-grained soil according to the soil particle size;
   dividing the contaminated site soil into high buffer capacity soil and low buffer capacity soil according to a buffer performance of the contaminated site soil; and
   adjusting composition and a ratio of a biostimulant solution added to the contaminated site soil based on a classification of the contaminated site soil, so as to improve the ability of microorganisms in the contaminated site soil to degrade petroleum hydrocarbons,
   wherein the step of dividing the contaminated site soil into high buffer capacity soil and low buffer capacity soil according to the buffer performance of the contaminated site soil comprises: adding 10 mM citrate buffer solution to the soil to classify the soil with pH<4.5 as low buffer capacity soil and classify the soil with pH>4.5 as high buffer capacity soil.

2. The method for remediating petroleum hydrocarbon contamination in groundwater of claim 1, wherein the step of detecting the soil particle size of contaminated site soil and dividing the contaminated site soil into coarse-grained soil and fine-grained soil according to the soil particle size comprises: classifying soil with a particle size between 0.075 mm and 60 mm and a mass greater than or equal to 50% of the total mass as coarse-grained soil; and classifying soil with a particle size not greater than 0.075 mm and a mass greater than or equal to 50% as fine-grained soil.

3. The method for remediating petroleum hydrocarbon contamination in groundwater of claim 1, wherein the method further comprises: adding a biosurfactant to the fine-grained soil to desorb the petroleum hydrocarbons adsorbed on clay when the soil particle size of the contaminated site soil is fine-grained soil; adding no biosurfactant when the soil particle size of the contaminated site soil is coarse-grained soil.

4. The method for remediating petroleum hydrocarbon contamination in groundwater of claim 1, wherein the method further comprises: dividing the contaminated site soil into calcareous soil and calcium-depleted soil according to a calcium content of the contaminated site soil, wherein the soil with a magnesium-calcium ratio Mg:Ca<0.12 in the soil is classified as calcareous soil, and the soil with the magnesium-calcium ratio Mg:Ca>0.12 in the soil is classified as calcium-depleted soil;
   Wherein the method further comprises dividing the contaminated site soil into high-iron soil and low iron soil according to an iron content of the contaminated site soil, wherein the soil with iron content >30 mg/L is classified as high iron soil, and the soil with iron content <30 mg/L is classified as low iron soil.

5. The method for remediating petroleum hydrocarbon contamination in groundwater of claim 4, wherein when the buffer performance of the contaminated site soil is high buffer capacity, calcareous and high-iron soil, a first salt chelating agent is added into the soil to provide electron acceptor $SO_4^{2-}$, so that the $SO_4^{2-}$ provided by a single donor in the contaminated site soil is in the range of a first acceptor;
   when the buffer performance of the contaminated site soil is high buffer capacity, calcareous and low-iron soil, a first concentration of low-molecular organic acid chelating agent is added into the soil, and a second concentration of first salt chelating agent is simultaneously added to provide electron acceptor $SO_4^{2-}$, wherein the first concentration is configured in such a way to be equal to the $Ca^{2+}$ content in the contaminated site under the current situation, and the overall content of $SO_4^{2-}$ provided by multiple sources of the first salt chelating agent and/or low-molecular organic acid chelating agent is in the range of the first acceptor.

6. The method for remediating petroleum hydrocarbon contamination in groundwater of claim 5, wherein, when the buffer performance of the contaminated site soil is low buffer capacity, calcareous and high-iron soil, a second salt chelating agent is added into the soil to provide electron acceptor $SO_4^{2-}$, wherein the second salt chelating agent differs from the first salt chelating agent at least in terms of cation, so that the $SO_4^{2-}$ provided by another single donor different from the first salt chelating agent in the contaminated site soil is in the range of the first acceptor.

7. The method for remediating petroleum hydrocarbon contamination in groundwater of claim 6, wherein, when the buffer performance of the contaminated site soil is high buffer capacity, calcium-depleted and low-iron soil, a first concentration of low-molecular organic acid chelating agent is added into the soil, and a fourth concentration of the second salt chelating agent is simultaneously added to provide electron acceptor $SO_4^{2-}$, wherein the first concentration is configured in such a way to be equal to the $Ca^{2+}$ content in the contaminated site under the current situation, and the overall content of $SO_4^{2-}$ provided by multiple sources of the second salt chelating agent and/or low-molecular organic acid chelating agent is in the range of the first acceptor.

8. The method for remediating petroleum hydrocarbon contamination in groundwater of claim 7, wherein, when the buffer performance of the contaminated site soil is low buffer capacity, calcareous and low-iron soil, a third concentration of low-molecular organic acid chelating agent is added into the soil, wherein the third concentration is configured in such a way to be less than the $Ca^{2+}$ content in the contaminated site under the current situation, and the first salt chelating agent is simultaneously added into the soil so that the overall content of $SO_4^{2-}$ provided by multiple sources of the first salt chelating agent and/or low-molecular organic acid chelating agent is in the range of the first acceptor.

\* \* \* \* \*